US012803694B2

(12) United States Patent
Li et al.

(10) Patent No.: US 12,803,694 B2
(45) Date of Patent: Nov. 17, 2026

(54) METHOD, SYSTEM AND APPARATUS OF TIME SYNCHRONIZATION SWITCHING

(71) Applicant: ZTE Corporation, Shenzhen (CN)

(72) Inventors: Zhendong Li, Shenzhen (CN); Jie Tan, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 274 days.

(21) Appl. No.: 18/707,111

(22) PCT Filed: May 5, 2022

(86) PCT No.: PCT/CN2022/091034

§ 371 (c)(1),
(2) Date: May 2, 2024

(87) PCT Pub. No.: WO2023/212874

PCT Pub. Date: Nov. 9, 2023

(65) Prior Publication Data

US 2025/0030495 A1 Jan. 23, 2025

(51) Int. Cl.
*H04L 7/00* (2006.01)
*H04J 3/06* (2006.01)

(52) U.S. Cl.
CPC .......... *H04J 3/0676* (2013.01); *H04J 3/0644* (2013.01)

(58) Field of Classification Search
CPC ...... H04J 3/0641; H04J 3/0644; H04J 3/0667; H04J 3/0676; H04W 56/0015
See application file for complete search history.

(56) References Cited

U.S. PATENT DOCUMENTS

| | | | | |
|---|---|---|---|---|
| 11,539,451 | B2 * | 12/2022 | Herber | H04J 3/0638 |
| 2014/0185632 | A1 * | 7/2014 | Steiner | H04J 3/0658 370/503 |
| 2014/0281037 | A1 * | 9/2014 | Spada | H04L 69/28 709/248 |
| 2018/0262287 | A1 | 9/2018 | Han et al. | |
| 2020/0228218 | A1 * | 7/2020 | Syväluoma | H04J 3/0667 |
| 2020/0280383 | A1 | 9/2020 | Herber et al. | |
| 2021/0367696 | A1 * | 11/2021 | Lin | H04J 3/0641 |
| 2022/0334930 | A1 * | 10/2022 | Li | H04J 3/0641 |

FOREIGN PATENT DOCUMENTS

| | | |
|---|---|---|
| CN | 102237996 A | 11/2011 |
| CN | 102710358 A | 10/2012 |
| CN | 106549724 A | 3/2017 |

(Continued)

OTHER PUBLICATIONS

International Search Report and Written Opinion for International Application No. PCT/CN2022/091034, mailed Nov. 30, 2022.

(Continued)

*Primary Examiner* — Phuc H Tran
(74) *Attorney, Agent, or Firm* — Vivacqua Crane, PLLC

(57) ABSTRACT

A wireless communication method for use in a first wireless network node is disclosed. The method includes receiving, from at least one second wireless network node, time synchronization status information associated with a switching of a grandmaster clock.

17 Claims, 8 Drawing Sheets

(56) References Cited

FOREIGN PATENT DOCUMENTS

| | | | |
|---|---|---|---|
| CN | 113518421 | A | 10/2021 |
| EP | 4 117 354 | A1 | 1/2023 |

OTHER PUBLICATIONS

Reiko, Gerstung, Synchronizing PTPv1 and PVPv2 Clients with One Common Time Source. International IEEE Symposium on Precision Clock Synchronization for Measurement, Control and Communication. Sep. 30, 2008, 6 pages.
Extended European Search Report for European Application No. 22940570.9, dated Feb. 16, 2026.
Garikiparthi, Updates to T13-SG15-C-0302 Proposed Appendix for G.8275.1. Juniper Networks, ITU-T Draft. Oct. 7-11, 2013;15(3):1-9.

* cited by examiner

METHOD, SYSTEM AND APPARATUS OF TIME SYNCHRONIZATION SWITCHING

CROSS-REFERENCE TO RELATED APPLICATION

This application is a national stage filing under 35 U.S.C. § 371 of international application number PCT/CN2022/091034, filed May 5, 2022. The contents of this application are incorporated herein by reference in its entirety.

TECHNICAL FIELD

This document is directed generally to wireless communications, and in particular to 5G communications.

BACKGROUND

Existing 5G systems (5GS) support time synchronization service to user equipment (UE). For example, an NG-RAN (next generation radio access network) can provide precise time information to the UE via a 5G AS (access stratum) signaling, which is called 5G access stratum time distribution. The 5GS (5G system) also supports a (g)PTP ((general) Precision Time Protocol) based time synchronization service, which depends on the 5G access stratum time distribution capability. To support the (g)PTP time synchronization service, the NG-RAN and a UPF/NW-TT (user plane function/network side Time Sensitive Network (TSN) translator) shall be time synchronized with a 5G internal GM (Grand master) clock.

In order to support a Disaster Tolerance, the 5GS needs to support a Timing Resiliency. That is, when a time source (i.e. 5G GM) fails or degrades, the time source can be switched to another 5G GM. Because the switching related to 5G GMs in the NG-RAN and the UPF/NW-TT are independent/asynchronous, the switching may cause the times of the NG-RAN and the UPF to be asynchronous in certain period. The (g)PTP base time synchronization may fail because of the time asynchronization.

SUMMARY

This document relates to methods, systems, and devices for time synchronization switching, and in particular to methods, systems, and devices for time synchronization switching for a 5GS.

The present disclosure relates to a wireless communication method for use in a first wireless network node. The method includes:

receiving, from at least one second wireless network node, time synchronization status information associated with a switching of a grandmaster clock.

Various embodiments may implement the following features.

In some embodiments, the time synchronization status information includes at least one of:

information on at least one grandmaster clock candidate to which the grandmaster clock is switched, or a switching time configured for the switching of the grandmaster clock.

In some embodiments, the wireless communication method further includes transmitting, to the at least one second wireless network node, a time switch request associated with the switching of the grandmaster clock.

In some embodiments, the time switch request includes at least one of:

information on a grandmaster clock candidate to which the grandmaster clock is switched, or an instructed switching time of switching the grandmaster clock to the grandmaster clock candidate.

In some embodiments, the information on the grandmaster clock candidate includes at least one of a grandmaster type, a grandmaster identifier, a grandmaster address or a grandmaster quality.

In some embodiments, the wireless communication method further includes transmitting, to the at least one second wireless network node, a subscription request for the time synchronization status information.

In some embodiments, the first wireless network node includes at least one of a session management function, a time sensitive communication and time synchronization function or a time sensitive networking adaptation function.

In some embodiments, the at least one second wireless network node includes at least one of a user plane function, a network time sensitive networking translator, or a radio access network node.

In some embodiments, the first network node includes a time sensitive communication and time synchronization function and/or a time sensitive networking adaptation function. In some embodiments, a signaling path between the first wireless network node and the at least one second wireless network node includes a policy control function and/or an access and mobility management function.

In some embodiments, the signaling path further includes a session management function.

The present disclosure further relates to a wireless communication method for use in a second wireless network node. The method includes:

transmitting, to a first wireless network node, time synchronization status information associated with a switching of a grandmaster clock.

Various embodiments may implement the following features.

In some embodiments, the time synchronization status information includes at least one of:

information on at least one grandmaster clock candidate to which the grandmaster clock is switched, or a switching time configured for the switching of the grandmaster clock.

In some embodiments, the wireless communication method further includes receiving, from the first wireless network node, a time switch request associated with the switching of the grandmaster clock.

In some embodiments, the time switch request includes at least one of:

information on a grandmaster clock candidate to which the grandmaster clock is switched, or an instructed switching time of switching the grandmaster clock to the selected grandmaster clock candidate.

In some embodiments, the information on the grandmaster clock candidate includes at least one of a grandmaster type, a grandmaster identifier, a grandmaster address or a grandmaster quality.

In some embodiments, the wireless communication method further includes receiving, from the first wireless network node, a subscription request for the time synchronization status information.

In some embodiments, the first wireless network node includes at least one of a session management function, a time sensitive communication and time synchronization function or a time sensitive networking adaptation function.

In some embodiments, the second wireless network node includes at least one of a user plane function, a network time sensitive networking translator, or a radio access network node.

In some embodiments, the first network node includes a time sensitive communication and time synchronization function and/or a time sensitive networking adaptation function. In some embodiments, a signaling path between the first wireless network node and the at least one second wireless network node includes a policy control function and/or an access and mobility management function.

In some embodiments, the signaling path further includes a session management function.

The present disclosure further relates to a wireless communication method for use in a second wireless network node. The method includes:

receiving, from a first wireless network node, a time switch request associated with a switching of a grandmaster clock.

Various embodiments may implement the following features.

In some embodiments, the time switch request includes at least one of:

information on a grandmaster clock candidate to which the grandmaster clock is switched, or an instructed switching time of switching the grandmaster clock to the selected grandmaster clock candidate.

In some embodiments, the information on the grandmaster clock candidate includes at least one of a grandmaster type, a grandmaster identifier, a grandmaster address or a grandmaster quality.

In some embodiments, the wireless communication method further includes receiving, from the first wireless network node, a subscription request for the time synchronization status information.

In some embodiments, the first wireless network node includes at least one of a session management function, a time sensitive communication and time synchronization function or a time sensitive networking adaptation function.

In some embodiments, the second wireless network node includes at least one of a user plane function, a network time sensitive networking translator, or a radio access network node.

In some embodiments, the first network node includes a time sensitive communication and time synchronization function and/or a time sensitive networking adaptation function. In some embodiments, a signaling path between the first wireless network node and the at least one second wireless network node includes a policy control function and/or an access and mobility management function.

In some embodiments, the signaling path further includes a session management function.

The present disclosure relates to a first wireless network node. The first wireless network node includes:

a communication unit, configured to receive, from at least one second wireless network node, time synchronization status information associated with a switching of a grandmaster clock.

Various embodiments may implement the following feature.

In some embodiments, the first wireless network node further includes a processor configured to perform any of the aforementioned wireless communication methods.

The present disclosure relates to a second wireless network node. The second wireless network node includes:

a communication unit, configured to transmit, to a first wireless network node, time synchronization status information associated with a switching of a grandmaster clock.

Various embodiments may in some embodiments implement the following feature.

In some embodiments, the second wireless network node further includes a processor configured to perform any of the aforementioned wireless communication methods.

The present disclosure relates to a second wireless network node. The second wireless network node includes:

a communication unit, configured to receive, from a first wireless network node, a time switch request associated with a switching of a grandmaster clock.

Various embodiments may implement the following feature.

In some embodiments, the second wireless network node further includes a processor configured to perform any of the aforementioned wireless communication methods.

The present disclosure relates to a computer program product comprising a computer-readable program medium code stored thereupon, the code, when executed by a processor, causing the processor to implement a wireless communication method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
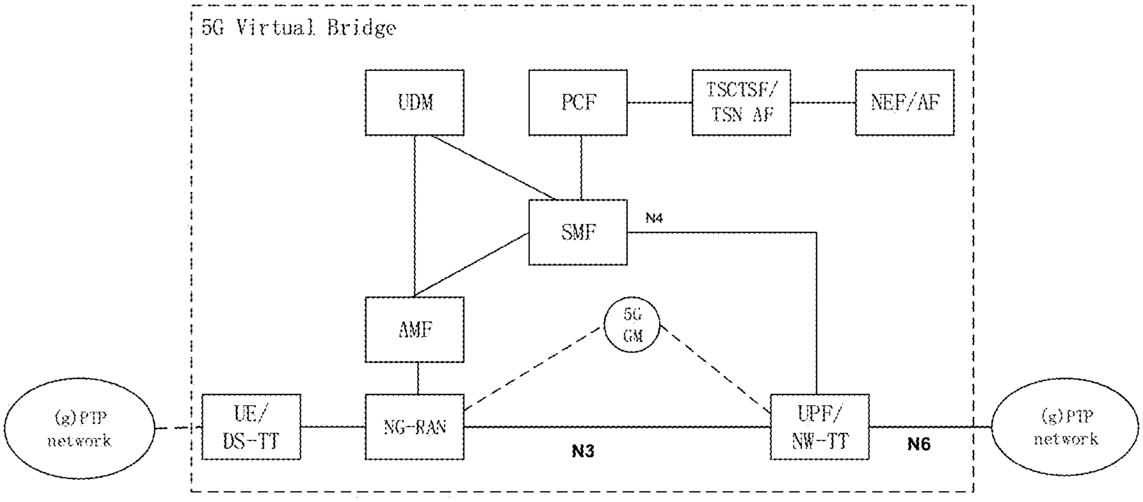
FIG. 1 shows a schematic diagram of a 5GS network (architecture) according to an embodiment of the present disclosure.

FIG. 1 shows a schematic diagram of a network (architecture) according to an embodiment of the present disclosure. In FIG. 1, the network includes the following network functions/entities:

1) User Equipment (UE):

The UE accesses the 5GS and obtains services via the NG-RAN and interacts with an Access and Mobility Control Function (AMF) of the core network via the NAS signaling. The Device side TSN translator (DS-TT) is inside the UE and provides a (g)PTP port functionality for the time synchronization.

2) Next Generation Radio Access Network (NG-RAN):

The NG-RAN may also be called 5G-AN (5G Access network, i.e. 5G Radio Access Network). The NG-RAN is responsible for an air interface resource scheduling and an air interface connection management of the network to which the UE is accessed. In the present disclosure, the NG-RAN may be equal to NG-RAN node or RAN (node).

3) Access and Mobility Management Function (AMF):

The AMF includes the following functionalities: Registration management, Connection management, Reachability management and Mobility Management. This network function also performs an access authentication and an access authorization. The AMF is a non-access stratum (NAS) security termination and relays session management (SM) NAS among the UE and a session management function (SMF), . . . , etc.

4) Session Management Function (SMF):

The SMF includes the following functionalities: Session Management (e.g. Session establishment, modify and release), UE IP address allocation & management (including optional Authorization), Selection and control of UP function, downlink data notification, etc.

5) User Plane Function (UPF):

The UPF includes the following functionalities: Anchor point for Intra-/Inter-RAT mobility, Packet routing & forwarding, Traffic usage reporting, QoS handling for user plane, Downlink packet buffering and downlink data notification triggering, etc. The Network side TSN translator (DS-TT) is inside/included in the UPF and provides the (g)PTP port functionality for the time synchronization.

6) Policy Control Function (PCF):

The PCF includes the following functionality: Supports unified policy framework to govern network behavior, provides policy rules to Control Plane function(s) to enforce the policy rule, implements a Front End to access subscription information relevant for policy decisions in a User Data Repository (UDR).

7) Network Exposure Function (NEF):

The NEF is deployed optionally for exchanging information between 5GC (5G core network) and an external Application Function (AF). In the present disclosure, the NEF/AF is used to present the NEF and AF for brevity.

8) Time Sensitive Communication and Time Synchronization Function (TSCTSF):

The TSCTSF controls the time synchronization services by controlling the NG-RAN to enable the 5G Access stratum time distribution and configuring the DS-TT and NW-TT when the 5GS is not integrated with a TSN network.

9) Time Sensitive Network Adaptation Function (TSN AF):

The TSN AF provides interworking and adaptation with Centralized Network Configuration (CNC) in an external TSN network.

To support PTP based time synchronization services, the 5GS simulates/acts as a bridge to an external PTP network (e.g. a TSN network, or a network supporting a standard IEEE 1588). This TSN bridge is called virtual/logical bridge. The "logical" TSN Bridge includes TSN Translator (TT) functionalities (i.e. the DS-TT in the UE and the NW-TT in the UPF) for interoperation between the PTP network and the 5GS.

In the present disclosure, the PTP may be equal to gPTP (i.e. IEEE 8201.AS) since the PTP may be compatible with the gPTP.

In the present disclosure, the term GM may be equal to "GM clock".

In FIG. 1, the network (architecture) includes a 5G internal GM clock which is used as a time source (e.g. GPS clock or GM clock) in the network. The NG-RAN and the UPF/NW-TT perform a time synchronization with the 5G GM separately. In other words, the NG-RAN and the UPF are assumed to be synchronous.

In addition, the UE also needs to be synchronized with the network. There are 2 time distribution methods for synchronizing the UE.

1) 5G Access Stratum Time Distribution

Figure 2:
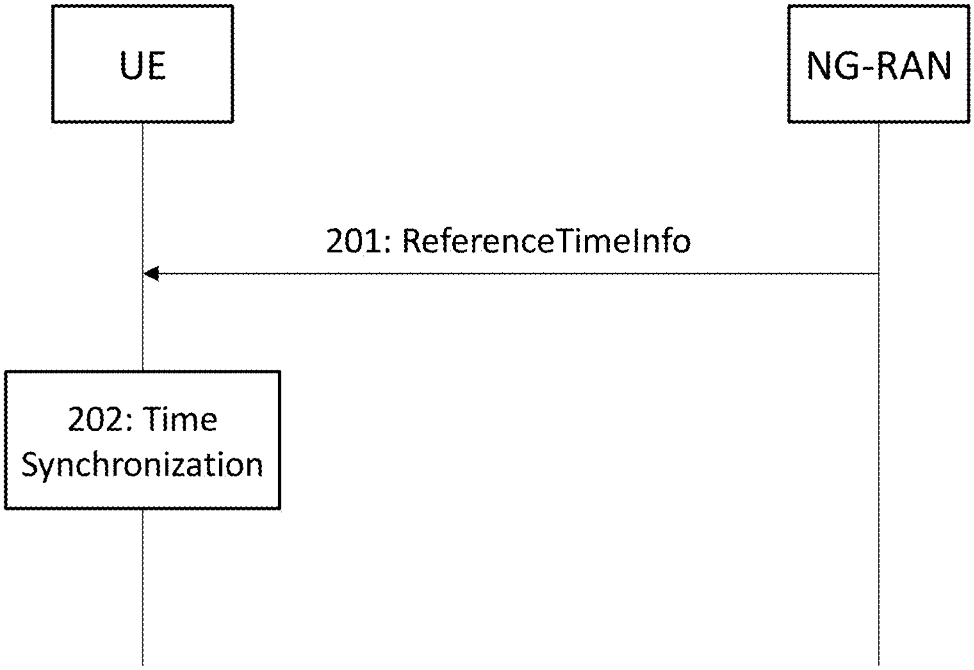
FIG. 2 shows schematic diagram of a time synchronization between the UE and the NG-RAN according to an embodiment of the present disclosure.

FIG. 2 shows schematic diagram of a time synchronization between the UE and the NG-RAN according to an embodiment of the present disclosure. Particularly, FIG. 2 shows how the UE obtains the 5G precise time over the air interface from the NG-RAN.

In step 201, the NG-RAN sends ReferenceTimeInfo to the UE in a SIB9 (System information Block 9) or RRC (radio resource control) message(s).

The ReferenceTimeInfo (i.e. reference time information) at least includes the following information elements/fields:

- referenceSFN: This field indicates a reference SFN (System Frame number) corresponding to a reference time and/or ReferenceTimeInfo.
- Time (ReferenceTime): The time field indicates the (reference) time at a boundary (e.g. a start or an end) of the reference SFN.

In step 202, the UE synchronize with (the time in) the NG-RAN based on the received ReferenceTimeInfo.

After steps 201 and 202, it is assumed that the UE/DS-TT, the NG-RAN and the UPF/NW-TT are synchronized in time. That is the UE/DS-TT, the NG-RAN and the UPF/NW-TT are assumed to share/have the same 5GS clock time.

2) (g)PTP Time Synchronization Over the 5GS

As above discussed, the 5GS supports the (g)PTP based time synchronization. In the (g)PTP based time synchronization, the 5GS acts as a Bridge node (e.g. TSN Bridge).

That is, from the outside of the 5GS, the 5GS acts/looks like a bridge between the DS-TT and the NW-TT interworking with the PTP network outside of the 5GS. For example, the PTP network may be a TSN network, an IEEE 1588 network, etc.

Figure 3:
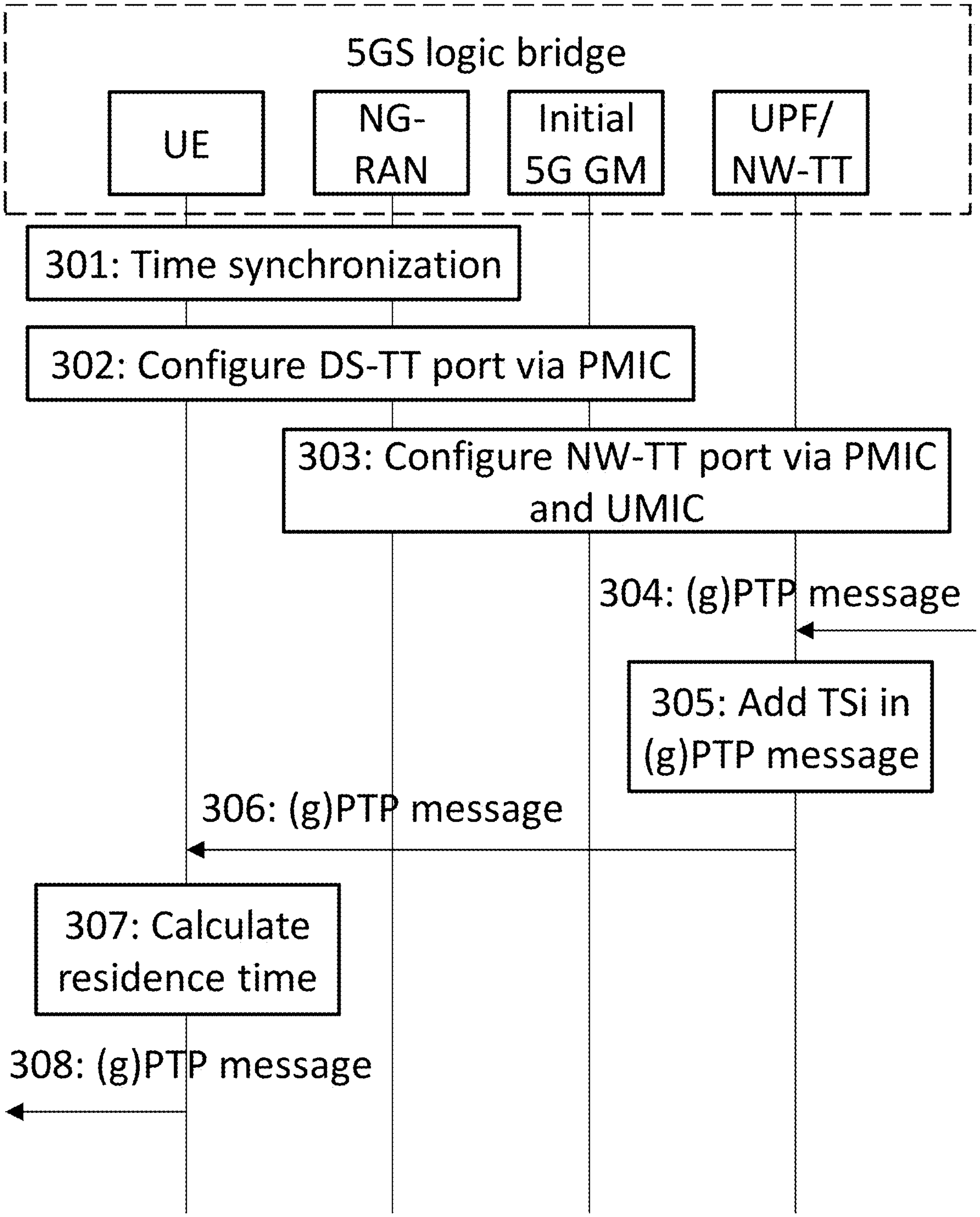
FIG. 3 shows a schematic diagram of the (g)PTP time synchronization according to an embodiment of the present disclosure.

FIG. 3 shows a schematic diagram of the (g)PTP time synchronization according to an embodiment of the present disclosure.

In step 301, the NG-RAN provides the 5GS precise time to the UE/DS-TT via an AS level signaling. For example, the procedure shown in FIG. 2 may be performed. After step 301, the UPF, the NG-RAN and the UE (are assumed to) have the same precise time. That is the time in the UPF, the NG-RAN and the UE are synchronized.

In step 302, the TSCTSF/TSN AF reads/configures a PTP port in the UE/DS-TT by using a PMIC (Port Management information Container) which is carried in a signaling for a PDU (protocol data unit) session. The signaling between the TSCTSF/TSN AF and the UE/DS-TT may be transmitted via the PCF, the SMF, the AMF and the NG-RAN.

In step 303, the TSCTSF/TSN AF reads/configures a PTP port in the UPF/NW-TT by using the PMIC and a UMIC (User-plane node Management information Container) which is carried in the signaling for the PDU session. The signaling between the TSCTSF/TSN AF and the UPF/NW-TT is transmitted via the PCF and the SMF.

In step 304, the UPF/NW-TT port receives a (g)PTP time synchronization message from an interface N6 between the UPF/NW-TT and the (g)PTP network.

In step 305, upon receiving the (g)PTP (synchronization) message from an upstream PTP instance/node in the (g)PTP network, the NW-TT (i.e. ingress TT in this embodiment) makes an ingress timestamp TSi for the received (g)PTP message. The ingress time stamp TSi is made based on the synchronized 5GS time.

In step 306, the UPF/NW-TT adds the ingress time stamp TSi in a Suffix field of the (g)PTP message and sends the (g)PTP message to the UE in the user plane (via PDU session).

In step 307, the UE/DS-TT (i.e. egress TT in this embodiment) creates an egress timestamp TSe when receiving the (g)PTP messages. The difference between the TSi and the TSe is considered to be residence time spent on the 5GS Bridging of this (g)PTP message. The egress timestamp TSe is made also based on the synchronized 5GS time. That is the residence time is calculated in the 5GS time domain.

In step 308, the UE/DS-TT converts the residence time spent on the 5GS bridging to the (g)PTP time domain, modifies the payload of the (g)PTP message and sends the (g)PTP message to a downstream (g)PTP node in the PTP network.

After the procedure shown in the FIG. 3 completes, the UE/DS-TT and UPF/NW-TT are time synchronized with the GM clock in the PTP network. In other words, the UE/DS-TT keeps the 5GS internal time (i.e. 5G GM clock) and an external time (PTP network GM clock) simultaneously.

FIG. 3 shows the (g)PTP time synchronization from the UPF/NW-TT to the UE/DS-TT. The (g)PTP time synchronization may be performed in the direction from the UE/DS-TT to the UPF/NW-TT. In the (g)PTP time synchronization from the UE/DS-TT to the UPF/NW-TT, the UE/DS-TT becomes the ingress TT and the UPF/NW-TT becomes the egress TT. Specifically, when the UE/DS-TT receives a (g)PTP (synchronization) message from a (g)PTP node, the DS-TT (i.e. ingress TT in this example) creates the ingress timestamp TSi and send the (g)PTP message comprising the ingress timestamp TSi to the UPF/NW-TT (i.e. egress TT in this example). The NW-TT creates the egress time stamp TSe and calculates the residence time. The UPF/NW-TT converts the residence time spent on the 5GS bridging to the (g)PTP time domain and modifies the payload of the (g)PTP message which will be sent to the downstream (g)PTP node in the PTP network.

When the 5G GM, which is currently the time source of the 5GS, degrades or is down, another 5G GM will be used as the time source of the 5GS. That is, the time source of the 5GS may change or switch from the initial 5G GM to another 5G GM (which may be called new 5G GM in the following). Because the time resource switching in the NG-RAN and the UPF are independent/asynchronous, the time in the NG-RAN and the UPF may become asynchronous for a certain period. The time asynchronization between the UPF and the NG-RAN (and UE/DS-TT) may result in a failure of the (g)PTP base time synchronization.

Figure 4:
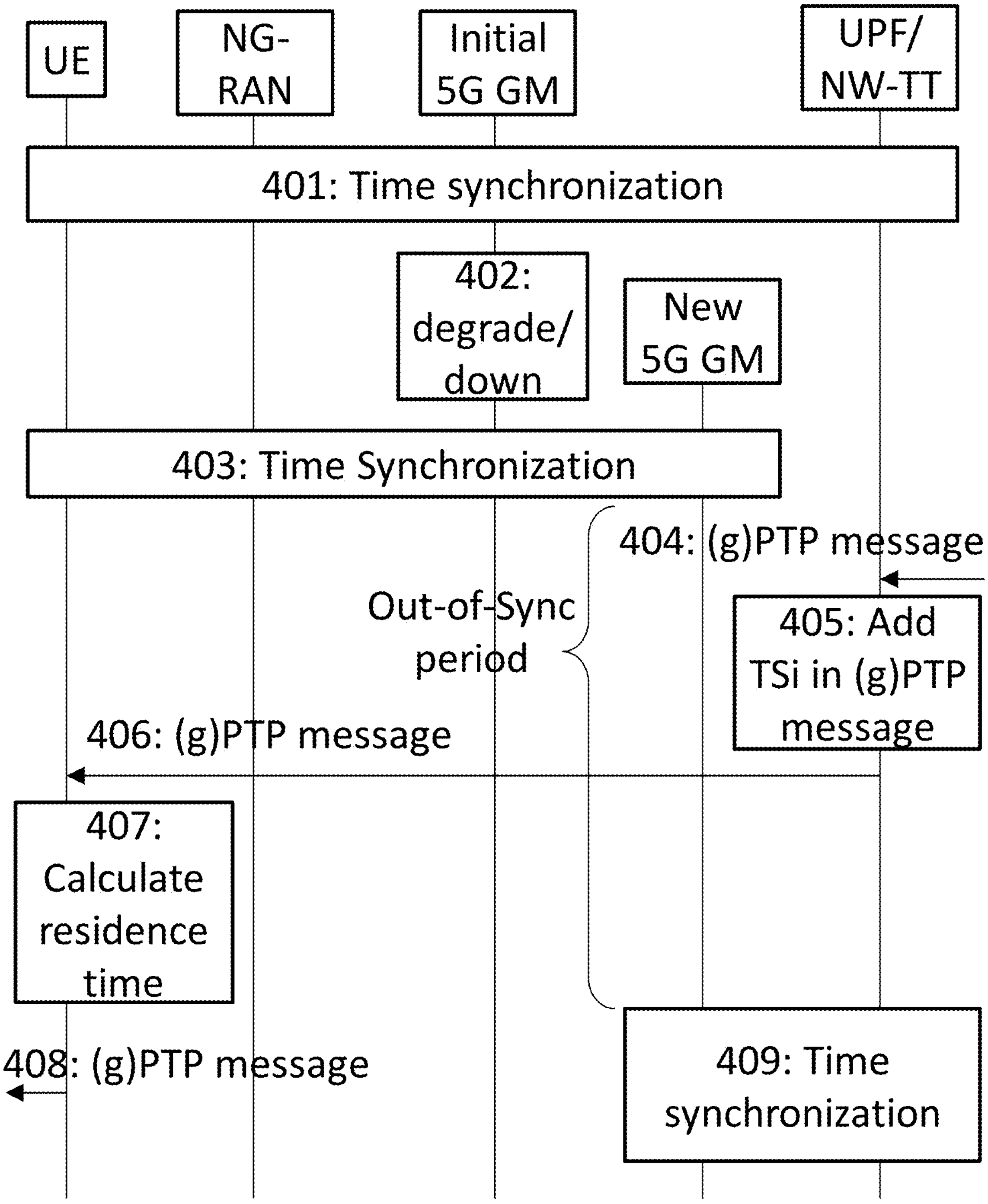
FIG. 4 shows a schematic diagram of the 5G GM (clock) switching according to an embodiment of the present disclosure.

FIG. 4 shows a schematic diagram of the 5G GM (clock) switching according to an embodiment of the present disclosure.

In step 401, the NG-RAN node provides the 5GS precise time to the UE/DS-TT via an AS level signaling. For example, the procedure shown in FIG. 2 may be performed. After step 401, the UPF, the NG-RAN and the UE (are assumed to) have the same precise time since the NG-RAN node and the UPF are synchronized with the initial 5G GM. That is the time in the UPF, the NG-RAN and the UE are (assumed to be) synchronized.

In step 402, the initial 5G GM degrades or is down.

In step 403, the NG-RAN switches to a new 5G GM, i.e., is synchronized with the new 5G GM. Note that, the NG-RAN may provide the precise time to UE (e.g. via the procedure in FIG. 2). Thus, the UE is synchronized with the new 5G GM via the NG-RAN.

In step 404, the UPF/NW-TT receives a (g)PTP message on the interface N6 (e.g. from an upstream PTP instance/node in the PTP network). Note that the UPF/NW-TT has not switched to/synchronized with the new 5G GM.

In step 405, upon receiving the (g)PTP message from the upstream PTP instance, the NW-TT makes an ingress timestamping TSi based on the initial 5G GM.

In step 406, the UPF/NW-TT adds the TSi in the Suffix field of the (g)PTP message and send the (g)PTP message to the UE in the user plane (via a PDU session).

In step 407, the UE/DS-TT creates an egress timestamp TSe based on the new 5G GM when receiving the (g)PTP messages. The UE/DC-TT calculate the residence time by:

$$\text{Residence time} = TSe\ (\text{based on the new 5G GM clock}) - TSi\ (\text{based on initial 5G GM clock}).$$

In step 408, the UE/DS-TT converts the calculated residence time to the (g)PTP time domain, modifies the payload of the (g)PTP message and sends the (g)PTP message to the PTP network.

In step 409, the UPF/NW-TT switches its time resource to the new 5G GM. The UPF/NW-TT synchronize with the new 5G GM.

In FIG. 4, there is an out-of-synchronization period from the step 403 to the step 409. In the out-of-synchronization period, the time resource of the NG-RAN (and UE/DS-TT) is different from that of the UPF/NW-TT. The offset between the new 5G GM and the initial 5G GM introduces an offset error in the calculated residence time, which may result in serious issues in time sensitive services/applications.

In some embodiments, when detecting that the current 5G GM clock (e.g. GM1) degrades or fails, the NG-RAN and/or the UPF/NW-TT may need to switch the time resource from the current/initial 5G GM clock GM1 to another/new 5G GM clock GM2. Under such conditions, the NG-RAN and/or the UPF/NW-TT reports its time synchronization status to a control point. The time synchronization status may include at least one of:

- information on the GM1 (e.g. quality/status/type of the GM1);
- associated capability (hold over time);
- information on a list of 5G GM candidates for the GM2 to which the time resource is switched (e.g. GM type and/or GM identifier/address and/or quality of each 5G GM candidate); or
- a switching time configured for switching from the GM1 to the GM2.

In some embodiments, the NG-RAN and/or the UPF/NW-TT may be predefined to report the time synchronization status to the control point.

In some embodiments, the control point may subscribe to the NG-RAN and/or the UPF/NW-TT for the time synchronization status. For example, the control point may transmit a subscription request to the NG-RAN and/or the UPF/NW-TT, to request the NG-RAN and/or the UPF/NW-TT to report the time synchronization status when detecting the current 5G GM clock degrades or fails.

In some embodiment, the control point includes at least one of the SMF, the TSCTSF or the TSN AF. In the present disclosure, a device/node includes a network function indicates that the device/node performs at least part of functionalities of the network function.

In some embodiments, after receiving the time synchronization status, the control point sends a time switch request to the NG-RAN and/or UPF/NW-TT. The time switch request includes at least one of:

- information on the GM2 to which the time resource is switched (e.g. GM type and/or GM identifier/address and/or quality of the 5G GM candidate); or
- an instructed switching time of switching from the GM1 to the GM2.

In some embodiments, the control point may receive the time synchronization status from one of the NG-RAN and the UPF/NW-TT and transmit the time switch request to at least one of the NG-RAN or the UPF/NW-TT (e.g. another one of the NG-RAN and the UPF/NW-TT).

In some embodiments, the control point may receive the time synchronization status from both the NG-RAN and the UPF/NW-TT and transmit the time switch request to at least one of the NG-RAN or the UPF/NW-TT.

In some embodiments, the control point receives the time synchronization status from both the NG-RAN and the UPF/NW-TT and determines whether to transmit the time switch request to at least one of the NG-RAN or the UPF/NW-TT based on the received time synchronization status.

In an embodiment, based on the time synchronization status from both the NG-RAN and the UPF/NW-TT, the control point may determine that the 5G GM switching performed by the NG-RAN and the UPF/NW-TT do not introduce the offset error and/or do not cause effects on the time sensitive applications/services. For example, based on the time synchronization status from both the NG-RAN and the UPF/NW-TT, the control point may determine that the 5G GM clock GM2 to which the NG-RAN will switch is the same with that to which the UPF/NW-TT will switch and that the switching time of the NG-RAN is approximately the same with that of the UPF/NW-TT. Under such conditions, the control point determines not to transmit the time switch request. In an embodiment, two switching times are approximately the same if a difference between these two switching times is smaller than a threshold, e.g. 1 ms (millisecond), 5 ms, etc.

Figure 5:
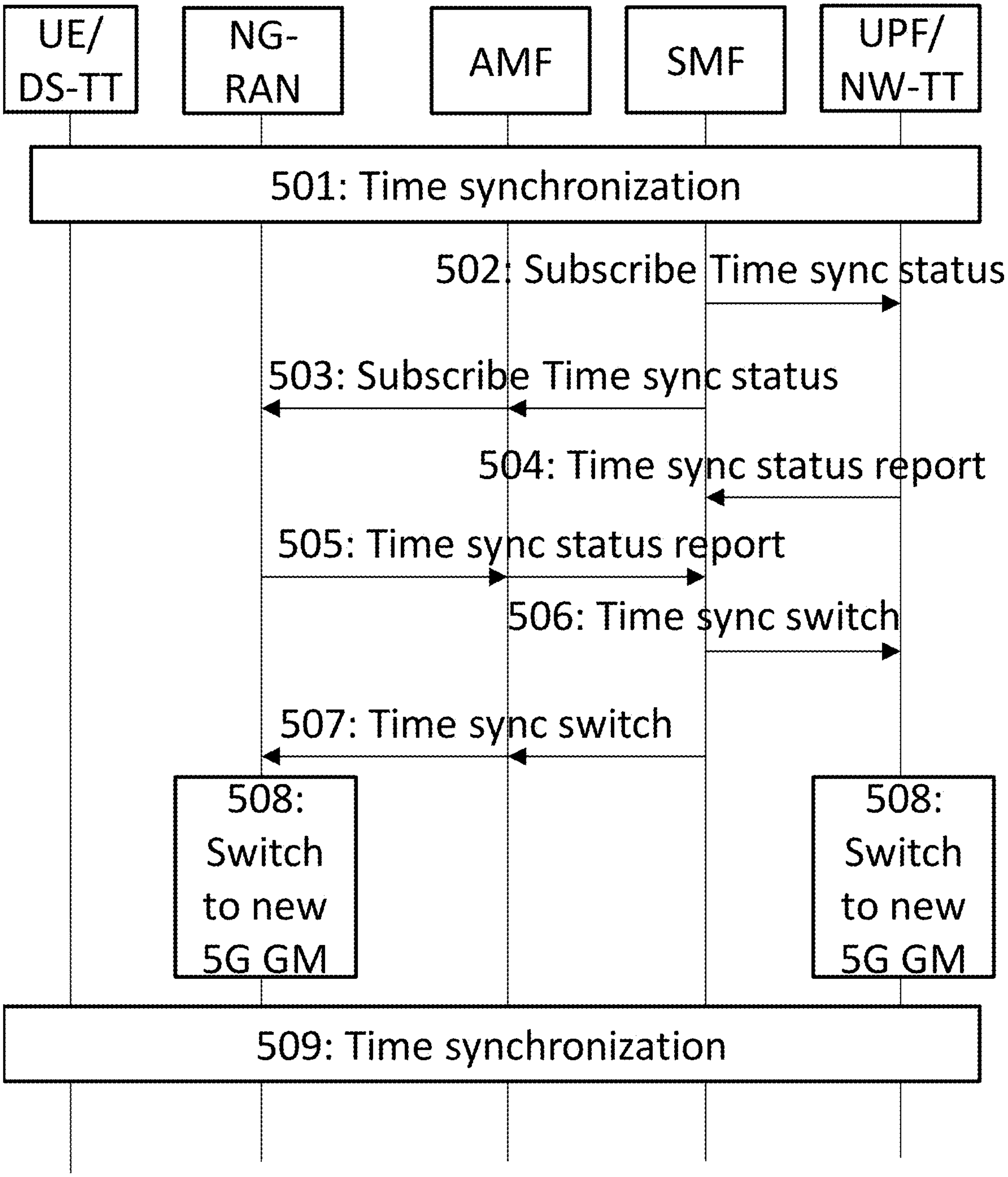
FIG. 5 shows a schematic diagram of the 5G GM (clock) switching according to an embodiment of the present disclosure.

FIG. 5 shows a schematic diagram of the 5G GM (clock) switching according to an embodiment of the present disclosure. In FIG. 5, the 5G GM switching is controlled by the SMF. Specifically, the 5G GM (clock) switching shown in FIG. 5 includes the following steps:

Step 501: The UPF/NW-TT and the NG-RAN are time synchronized with an initial/current 5G GM clock. The NG-RAN provides the precise time to UE (i.e. via the procedure shown in FIG. 2).

Step 502: The SMF subscribes to a time synchronization status (information) from the UPF/NW-TT. That is the UPF/NW-TT may be requested to report new 5G GM information and possible switching time when detecting a degradation or failure of the initial/current 5G GM.

Step 503: The SMF subscribes to a time synchronization status (information) from the NG-RAN via the AMF. In other words, the UPF/NW-TT may be requested to report the new 5G GM info and possible switching time when detecting a degradation or failure of the initial/current 5G GM.

Step 504: When the UPF/NW-TT detects the 5G GM degrade or fails, it reports the time synchronization status to the SMF. The time synchronization status may include:

- old/initial/current 5G GM information;
- UPF/NW-TT capability (e.g. hold over time of the UPF/NW-TT);
- information on new 5G GM list (e.g. new GM type, new GM ID/address, quality of each 5G GM candidate for the new 5G GM);
- switching time of the switching from the old 5G GM to the new 5G GM.

Step 505: When the NG-RAN node detects that the old/initial/current 5G GM degrades or fails, the NG-RAN node reports the time synchronization status to the SMF via the AMF. In an embodiment, the NG-RAN sends the time synchronization status to the AMF in an N2 request, and AMF send it to the SMF in an SMF service operation (e.g. Nsfm_PDUSession_Update). The time synchronization status is similar with that in step 504.

Based on the time synchronization status received from the NG-RAN and/or the UPF, the SMF determines a switching time that the NG-RAN and the UPF switching to the new 5G GM. The determined switching time may be expressed in the old 5G GM time, or the new 5G GM time.

In an embodiment, the SMF may further determine/select a 5G GM candidate as the new 5G GM based on the reported time synchronization status. For example, if the new GM type(s) and/or GM ID(s) of the 5G GM candidate(s) reported by the NG-RAN is different from the new GM type(s) and/or GM ID(s) of the 5G GM candidate(s) reported by the UPF, the SMF may need to determine/select one of the reported 5G GM candidates as the new 5G GM to which both the UPF and the NG-RAN switch. As an alternative or in addition, if the UPF/NG-RAN reports a plurality of 5G GM candidates (e.g. a list of 5G GM candidates), the SMF may also need to determine/select one of the reported 5G GM candidates as the new 5G GM to which both the UPF and the NG-RAN switch.

Note that the steps 504 and 505 may be parallel steps. As an alternative, one of the steps 504 and 505 may occur before another one of the steps 504 and 505.

Step 506: The SMF sends Time synchronization switch information to the UPF/NW-TT, e.g., in an N4 request. The Time synchronization switch information may indicate at least one of a switching time or the (selected/determined)

new 5G GM (e.g. GM type and/or GM ID). In an embodiment, the switching time may be expressed in the old 5G GM time, or the new 5G GM time.

Step 507: The SMF sends the Time synchronization switch information to the NG-RAN via the AMF. The Time synchronization switch information may indicate at least one of a switching time or the (selected/determined) new 5G GM (e.g. GM type and/or GM ID). In an embodiment, the switching time may be express in the old 5G GM time, or the new 5G GM time.

Step 508: The NG-RAN and the UPF/NW-TT switch to the new 5G GM at the instructed switched time.

Step 509: After step 508, the UPF/NW-TT and NG-RAN are time synchronized with the new 5G GM clock. The NG-RAN provides the precise time to the UE (e.g. via the procedure shown in FIG. 2).

Figure 6:
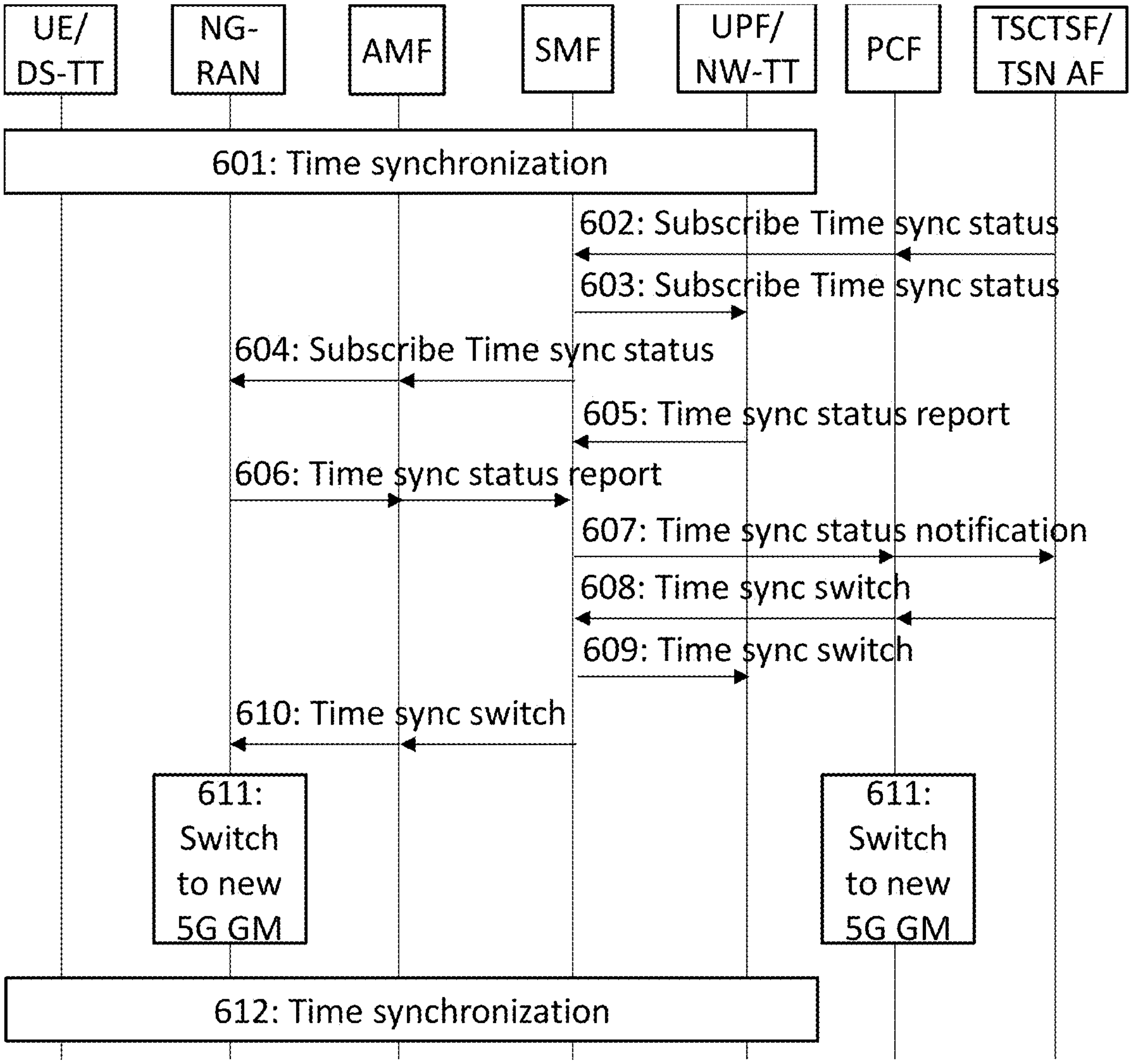
FIG. 6 shows a schematic diagram of the 5G GM (clock) switching according to an embodiment of the present disclosure.

FIG. 6 shows a schematic diagram of the 5G GM (clock) switching according to an embodiment of the present disclosure. In FIG. 6, the 5G GM switching is controlled by the TSCTSF/TSN AF. Specifically, the 5G GM (clock) switching shown in FIG. 6 includes the following steps:

Step 601: The UPF/NW-TT and NG-RAN are time synchronized with the initial/current 5G GM clock. The NG-RAN provides the precise time to UE (e.g. via the procedure shown in FIG. 2).

Step 602: The TSCTSF/TSN AF subscribes to time synchronization status (information) from the UPF/NW-TT and the NG-RAN. In an embodiment, the TSCTSF/TSN AF may request the UPF/NW-TT and the NG-RAN to report the new 5G GM info and possible switching time. The message between TSCTSF/TSN AF and the UPF/NW-TT may be carried in a PMIC (Port Management Information Container) or a UMIC (User-plane node Management Information Container). The TSCTSF/TSN AF may invoke an Npcf_Policy Authorization service to send the request to the PCF and the PCF may invoke an Npcf_SMPolicyControl service to send the subscription request to the SMF.

Step 603: The SMF subscribes to the time synchronization status from the UPF/NW-TT.

Step 604: The SMF subscribes to the time synchronization status from the NG-RAN via the AMF.

Step 605: When the UPF/NW-TT detects the initial/old 5G GM degrades or fails, the UPF/NW-TT reports the time synchronization status to the SMF. The time synchronization status may include at least one of:

- old/initial/current 5G GM information;
- UPF/NW-TT capability (e.g. hold over time of the UPF/NW-TT);
- information on new 5G GM list (e.g. new GM type, new GM ID/address, quality of each 5G GM candidate for the new 5G GM); or
- switching time of the switching from the old 5G GM to the new 5G GM.

Step 606: When the NG-RAN detects the initial/old 5G GM degrades or fails, the NG-RAN reports the time synchronization status to the SMF via the AMF. In an embodiment, the NG-RAN sends the time synchronization status to the AMF in an N2 request and the AMF sends the time synchronization status to the SMF in an SMF service operation (e.g. Nsfm_PDUSession_Update). The time synchronization status is similar with that in step 605.

Note that the steps 605 and 606 may be parallel steps. As an alternative, one of the steps 605 and 606 may occur before another one of the steps 605 and 606.

Step 607: The SMF notifies the TSCTSF/TSN AF via the PCF of the received time synchronization status. For example, the SMF sends the time synchronization status by invoking an Npcf_SMPolicyControl_Update service operation towards the PCF and the PCF sends the time synchronization status by invoking an Npcf_PolicyAuthorization_Notify service operation towards the TSCTSF/TSN AF.

In an embodiment, the step 607 may be triggered by step 605 or step 606. As an alternative, the SMF may initiates the step 607 after receiving the time synchronization status from both the UPF and the NG-RAN.

Step 608: The TSCTSF/TSN AF determines the switching time that the NG-RAN and UPF need to switch to the new 5G GM. The switching time can be expressed in the old 5G GM time, or the new 5G GM time.

In an embodiment, the TSCTSF/TSN AF may further determine/select a 5G GM candidate as the new 5G GM based on the reported time synchronization status. For example, if the new GM type(s) and/or GM ID(s) of the 5G GM candidate(s) reported by the NG-RAN is different from the new GM type(s) and/or GM ID(s) of the 5G GM candidate(s) reported by the UPF, the TSCTSF/TSN AF may need to determine/select one of the reported 5G GM candidates as the new 5G GM to which both the UPF and the NG-RAN switch. As an alternative or in addition, if the UPF/NG-RAN reports a plurality of 5G GM candidates (e.g. a list of 5G GM candidates), the TSCTSF/TSN AF may also need to determine/select one of the reported 5G GM candidates as the new 5G GM to which both the UPF and the NG-RAN switch.

The TSCTSF/TSN AF sends time synchronization switch information to the SMF via the PCF. The time synchronization switch information may include/indicate the determined switching time and/or the new 5G GM (e.g. GM type and/or GM ID of the new 5G GM). The switching time can be expressed in the old 5G GM time or the new 5G GM time. The TSCTSF/TSN AF may send the time synchronization switch information to the PCF by invoking an Npcf_PolicyAuthorization_Update. The PCF may send the time synchronization switch information to the SMF by invoking an Npcf_SMPolicyControl_Update.

In an embodiment, the time synchronization switch information sent to the PCF may be carried in the PMIC or the UMIC.

Step 609: The SMF sends the time synchronization switch information to the UPF/NW-TT in an N4 request. The time synchronization switch information may include/indicate the determined switching time and/or the new 5G GM (e.g. GM type and/or GM ID of the new 5G GM). The switching time can be expressed in the old 5G GM time or the new 5G GM time.

Step 610: The SMF sends the time synchronization switch information to the NG-RAN via the AMF. The time synchronization switch information may include/indicate the determined switching time and/or the new 5G GM (e.g. GM type and/or GM ID of the new 5G GM). The switching time can be expressed in the old 5G GM time or the new 5G GM time.

Step 611: The NG-RAN and UPF/NW-TT switch to the new 5G GM at the switching time indicated/included in the time synchronization switch information.

Step 612: The UPF/NW-TT and NG-RAN are time synchronized with new 5G GM clock and NG-RAN provides the precise time to UE (e.g. via the procedure shown in FIG. 2).

Figure 7:
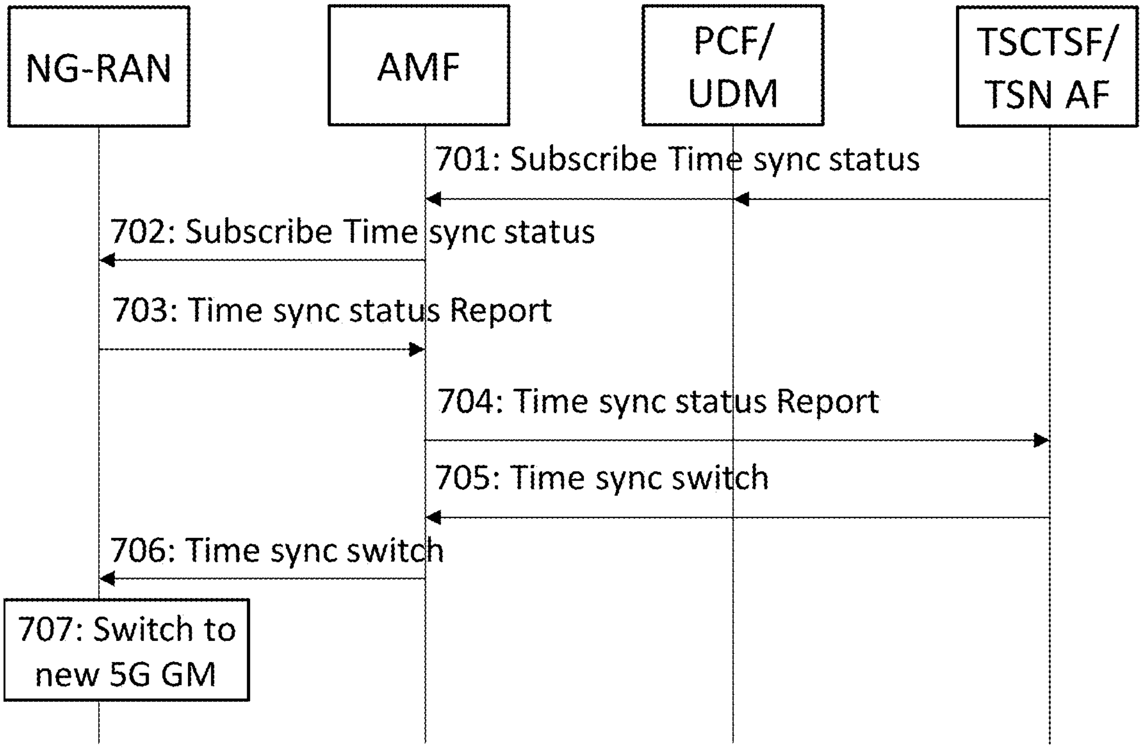
FIG. 7 shows a schematic diagram of the 5G GM (clock) switching according to an embodiment of the present disclosure.

FIG. 7 shows a schematic diagram of the 5G GM (clock) switching according to an embodiment of the present disclosure. In FIG. 7, the signaling path from the TSCTSF and the NG-RAN does not include the SMF. Specifically, the 5G GM (clock) switching shown in FIG. 7 includes the following steps:

Step 701: The TSCTSF/TSN AF subscribes to the time synchronization status from the NG-RAN. The TSCTSF/TSN AF may request the NG-RAN to report the new 5G GM information and possible switching time. The TSCTSF/TSN AF send the subscription request to the AMF.

In FIG. 7, the TSCTSF/TSN AF checks the UDM to find the AMF serving the UE and sends the subscription request to the AMF.

In an embodiment, the TSCTSF/TSN AF may check a BSF (binding support function) to find the PCF (e.g. access and mobility management PCF (AM-PCF)) and send the subscription request to the PCF. The PCF sends the subscription request to the AMF.

Step 702: The AMF subscribes to the time synchronization status from the NG-RAN.

Step 703: When the NG-RAN detects the (initial/current) 5G GM degrades or fails, the NG-RAN reports the time synchronization status to the AMF in an N2 request. The time synchronization status may include:

The time synchronization status may include at least one of:

- old/initial/current 5G GM information;
- UPF/NW-TT capability (e.g. hold over time of the UPF/NW-TT);
- information on new 5G GM list (e.g. new GM type, new GM ID/address, quality of each 5G GM candidate for the new 5G GM); or
- switching time of the switching from the old 5G GM to the new 5G GM.

Step 704: The AMF sends the time synchronization status to the TSCTSF/TSN AF. In this embodiment, the time synchronization status may be sent to the TSCTSF/TSN AF via the PCF.

Step 705: The TSCTSF/TSN AF determines the switching time that the NG-RAN needs to switch to the new 5G GM. The determined switching time may be expressed in the old 5G GM time, or the new 5G GM time. The TSCTSF/TSN AF may also determine the new 5G GM to which the NG-RAN switches.

In FIG. 7, the TSCTSF/TSN AF sends the time sync switch information to the AMF.

Step 706: The AMF sends the time sync switch information to the NG-RAN.

Step 707: The NG-RAN switches to the new 5G GM at the switching time indicated/included in the time sync switch information.

Figure 8:
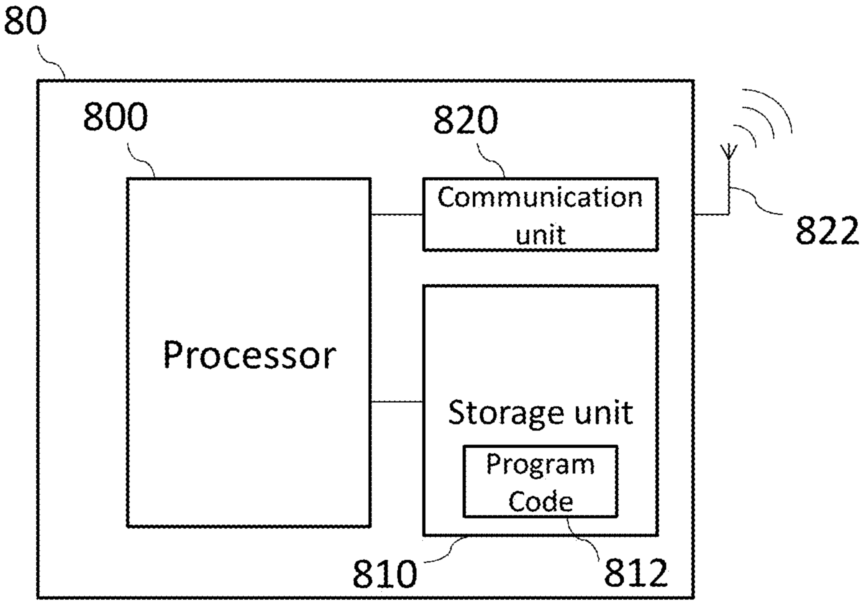
FIG. 8 shows an example of a schematic diagram of a wireless terminal according to an embodiment of the present disclosure.

FIG. 8 relates to a schematic diagram of a wireless terminal 80 according to an embodiment of the present disclosure. The wireless terminal 80 may be a user equipment (UE), a mobile phone, a laptop, a tablet computer, an electronic book or a portable computer system and is not limited herein. The wireless terminal 80 may include a processor 800 such as a microprocessor or Application Specific Integrated Circuit (ASIC), a storage unit 810 and a communication unit 820. The storage unit 810 may be any data storage device that stores a program code 812, which is accessed and executed by the processor 800. Embodiments of the storage unit 810 include but are not limited to a subscriber identity module (SIM), read-only memory (ROM), flash memory, random-access memory (RAM), hard-disk, and optical data storage device. The communication unit 820 may a transceiver and is used to transmit and receive signals (e.g. messages or packets) according to processing results of the processor 800. In an embodiment, the communication unit 820 transmits and receives the signals via at least one antenna 822 shown in FIG. 8.

In an embodiment, the storage unit 810 and the program code 812 may be omitted and the processor 800 may include a storage unit with stored program code.

The processor 800 may implement any one of the steps in exemplified embodiments on the wireless terminal 80, e.g., by executing the program code 812.

The communication unit 820 may be a transceiver. The communication unit 820 may as an alternative or in addition be combining a transmitting unit and a receiving unit configured to transmit and to receive, respectively, signals to and from a wireless network node (e.g. a base station).

Figure 9:
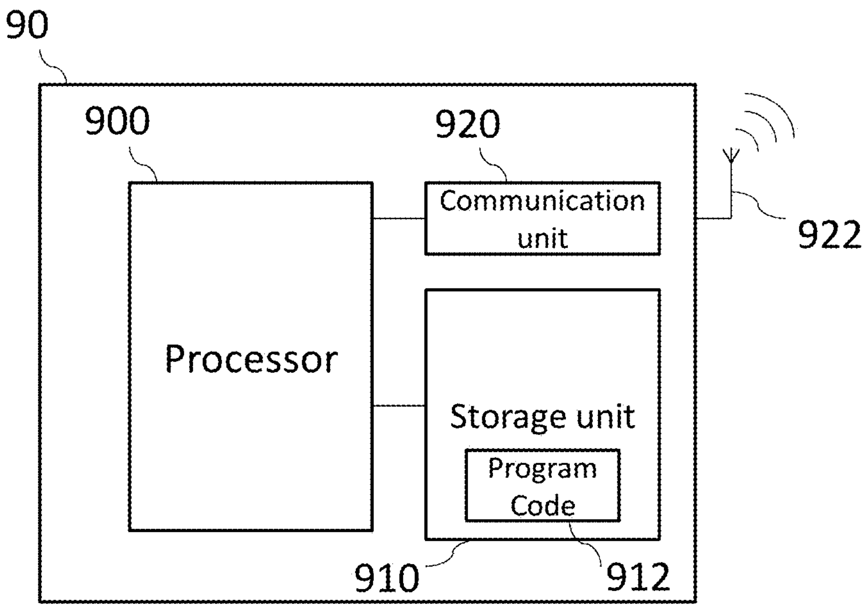
FIG. 9 shows an example of a schematic diagram of a wireless network node according to an embodiment of the present disclosure.

FIG. 9 relates to a schematic diagram of a wireless network node 90 according to an embodiment of the present disclosure. The wireless network node 90 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 90 may include/perform at least one network function such as an access and mobility management function (AMF), a session management function (SMF), a user plane function (UPF), a policy control function (PCF), an application function (AF), a time sensitive communication and time synchronization function (TSCTSF) or a time sensitive networking adaptation function (TSN AF), etc. The wireless network node 90 may include a processor 900 such as a microprocessor or ASIC, a storage unit 910 and a communication unit 920. The storage unit 910 may be any data storage device that stores a program code 912, which is accessed and executed by the processor 900. Examples of the storage unit 910 include but are not limited to a SIM, ROM, flash memory, RAM, hard-disk, and optical data storage device. The communication unit 920 may be a transceiver and is used to transmit and receive signals (e.g. messages or packets) according to processing results of the processor 900. In an example, the communication unit 920 transmits and receives the signals via at least one antenna 922 shown in FIG. 9.

In an embodiment, the storage unit 910 and the program code 912 may be omitted. The processor 900 may include a storage unit with stored program code.

The processor 900 may implement any steps described in exemplified embodiments on the wireless network node 90, e.g., via executing the program code 912.

The communication unit 920 may be a transceiver. The communication unit 920 may as an alternative or in addition be combining a transmitting unit and a receiving unit configured to transmit and to receive, respectively, signals to and from a wireless terminal (e.g. a user equipment or another wireless network node).

Figure 10:
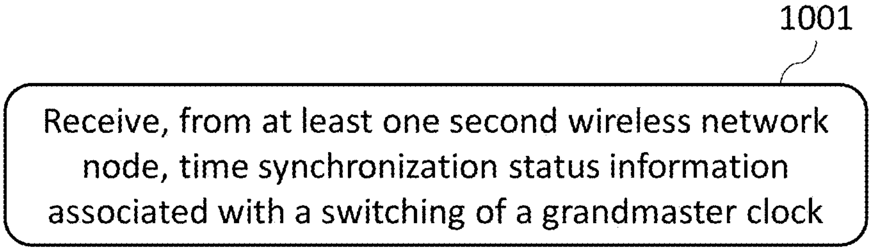
FIGS. 10 to 12 are flowcharts of methods according to embodiments of the present disclosure.

FIG. 10 shows a flowchart of a method according to an embodiment of the present disclosure. The method shown in FIG. 10 may be used in a first wireless network node (e.g. the SMF, the TSCTSF, the TSN AF, a wireless network node comprising at least one of the SMF, the TSCTSF or the TSN AF or a wireless network node performing at least part of functionalities of at least one of the SMF, the TSCTSF and the TSN AF) and includes the following step:

Step 1001: Receive, from at least one second wireless network node, time synchronization status information associated with a switching of a grandmaster clock.

In the embodiment shown in FIG. 10, the first wireless network node receives time synchronization status information from at least one second wireless network node. The time synchronization status information is associated with a switching of a (5G) GM clock (e.g. switching from a first GM clock to a second GM clock). For example, the time synchronization status information includes at least one of:

information on an initial GM clock from which the GM clock is switched (i.e. the first GM clock), a wireless network node capability (e.g. hold over time of the first wireless network node)

information on at least one GM clock candidate to which the GM clock is switched (e.g. a list of grandmaster clock candidate(s) for the second GM clock), or a switching time configured for the switching of the GM clock (e.g. the time of the first wireless network node planning to switch the GM clock from the first GM clock to the second GM clock).

In an embodiment, the first wireless network node may transmit a time switch request/information associated with the switching of the GM clock to the second wireless network node(s). Note that the first wireless network node may be predefined to transmit the time switch request/information in response to the received the time synchronization status information. As an alternative or in addition, based on the received the time synchronization status information, the first wireless network node may determine whether to transmit the time switch request/information and/or the second wireless network node to which the time switch request/information is sent/transmitted.

In an embodiment, the time switch request/information includes at least one of:

information on a GM clock candidate to which the grandmaster clock is switched (i.e. the second GM clock), or an instructed switching time of switching the grandmaster clock to the GM clock candidate.

In an embodiment, the first wireless network node may determine/select a GM clock candidate to which the GM clock is switched (i.e. the second GM clock) and/or an instructed switching time of switching the GM clock to the determined/selected GM clock candidate.

In an embodiment, the information on the GM clock or the GM clock candidate includes at least one of: a GM type, a GM ID, a GM address or a GM (clock) quality.

In an embodiment, the first wireless network node transmits a subscription request for the time synchronization status information to the second wireless network node(s), to subscribe to the time synchronization status information.

In an embodiment, the second wireless network node includes at least one of a UPF, a NW-TT, or a RAN node (e.g. NG-RAN).

In an embodiment of the first wireless network node comprising/being the TSCTSF/TSN AF, a signaling path between the first wireless network node and the second wireless network node(s) includes a PCF and/or an AMF.

In an embodiment, the signaling path between the first wireless network node and the second wireless network node(s) may further include an SMF.

Figure 11:
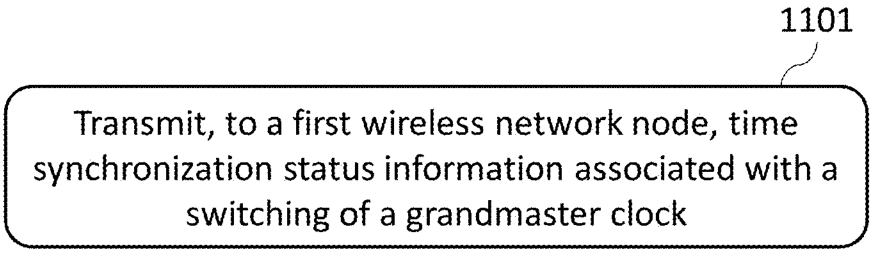

FIG. 11 shows a flowchart of a method according to an embodiment of the present disclosure. The method shown in FIG. 11 may be used in a second wireless network node (e.g. the UPF, the NW-TT, the RAN node, a wireless network node comprising at least one of the UPF, the NW-TT and the RAN node or a wireless network node perform at least part of functionalities of at least one of the UPF, the NW-TT or the RAN node) and includes the following step:

Step 1101: Transmit, to a first wireless network node, time synchronization status information associated with a switching of a grandmaster clock.

In this embodiment, the second wireless network node transmits time synchronization status information associated with a switching of a grandmaster clock (e.g. from a first GM clock to a second GM clock). For example, the second wireless network node may transmit the time synchronization status information when detecting that the first/current GM clock (e.g. initial 5G GM shown in FIG. 3 or 4) degrades or fails or is down and/or when determining to switch the GM clock from the first GM clock to the second GM clock.

In an embodiment, the time synchronization status information includes at least one of:

information on an initial GM clock from which the GM clock is switched (i.e. the first GM clock), a wireless network node capability (e.g. hold over time of the first wireless network node)

information on at least one GM clock candidate to which the GM clock is switched (e.g. a list of grandmaster clock candidate(s) for the second GM clock), or a switching time configured for the switching of the GM clock (e.g. the time of the first wireless network node planning to switch the GM clock from the first GM clock to the second GM clock).

In an embodiment, the second wireless network node may receive a time switch request/information from the first wireless network node. The time switch request/information is associated with the switching of the GM clock.

In an embodiment, the time switch request/information includes at least one of:

information on a GM clock candidate to which the grandmaster clock is switched (i.e. the second GM clock), or an instructed switching time of switching the grandmaster clock to the GM clock candidate.

In an embodiment, the information on the GM clock or the GM clock candidate includes at least one of: a GM type, a GM ID, a GM address or a GM (clock) quality.

In an embodiment, the second wireless network node may be predefined to transmit the time synchronization status information to the first wireless network node.

In an embodiment, the second wireless network node receives, from the first wireless network node, a subscription request for (subscribing to) the time synchronization status information.

In an embodiment, the first wireless network node may include/be an SMF and/or a TSCTSF and/or a TSN AF.

In an embodiment of the first wireless network node comprising/being the TSCTSF and/or the TSN AF, a signaling path between the first wireless network node and the second wireless network node includes a PCF and/or an AMF.

In an embodiment, the signaling path between the first wireless network node and the second wireless network node may further include an SMF.

Figure 12:
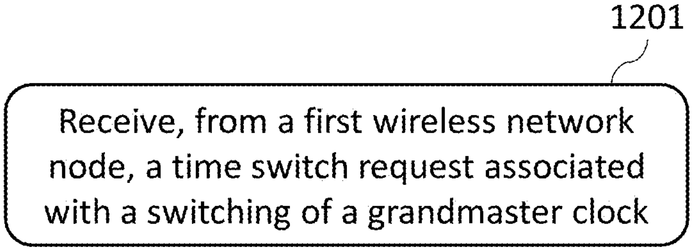

FIG. 12 shows a flowchart of a method according to an embodiment of the present disclosure. The method shown in FIG. 12 may be used in a second wireless network node (e.g. the UPF, the NW-TT, the RAN node, a wireless network node comprising at least one of the UPF, the NW-TT and the RAN node or a wireless network node perform at least part of functionalities of at least one of the UPF, the NW-TT or the RAN node) and includes the following step:

Step 1201: Receive, from a first wireless network node, a time switch request associated with a switching of a grandmaster clock.

In FIG. 12, the second wireless network node receives a time switch request/information associated with (e.g. indicating) a switching of a GM clock. For example, the time switch request may indicate the switching from a first GM clock to a second GM clock. Note that the second wireless network node may not transmit time synchronization status information associated with the switching of the GM clock prior to/before receiving the time switch request/information in this embodiment.

In an embodiment, the time switch request/information includes at least one of:

information on a GM clock candidate to which the grandmaster clock is switched (i.e. the second GM clock), or an instructed switching time of switching the grandmaster clock to the GM clock candidate.

In an embodiment, the information on the GM clock or the GM clock candidate includes at least one of: a GM type, a GM ID, a GM address or a GM (clock) quality.

In an embodiment, the first wireless network node may include/be an SMF and/or a TSCTSF and/or a TSN AF.

In an embodiment of the first wireless network node comprising/being the TSCTSF and/or the TSN AF, a signaling path between the first wireless network node and the second wireless network node includes a PCF and/or an AMF.

In an embodiment, the signaling path between the first wireless network node and the second wireless network node may further include an SMF.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of the claims. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a first wireless network node, the method comprising:

receiving, from at least one second wireless network node, time synchronization status information associated with a switching of a grandmaster clock; and transmitting, to the at least one second wireless network node, a time switch request associated with the switching of the grandmaster clock;

wherein the time switch request comprises at least one of:

information on a grandmaster clock candidate to which the grandmaster clock is switched, or an instructed switching time of switching the grandmaster clock to the grandmaster clock candidate.

2. The wireless communication method of claim 1, wherein the time synchronization status information comprises at least one of:

information on at least one grandmaster clock candidate to which the grandmaster clock is switched, or a switching time configured for the switching of the grandmaster clock.

3. The wireless communication method of claim 2, wherein the information on the grandmaster clock candidate comprises at least one of a grandmaster type, a grandmaster identifier, a grandmaster address or a grandmaster quality.

4. The wireless communication method of claim 1, further comprising:

transmitting, to the at least one second wireless network node, a subscription request for the time synchronization status information.

5. The wireless communication method of claim 1, wherein the first wireless network node comprises at least one of a session management function, a time sensitive communication and time synchronization function or a time sensitive networking adaptation function.

6. The wireless communication method of claim 1, wherein the at least one second wireless network node comprises at least one of a user plane function, a network time sensitive networking translator, or a radio access network node.

7. The wireless communication method of claim 1, wherein the first network node comprises a time sensitive communication and time synchronization function and/or a time sensitive networking adaptation function, wherein a signaling path between the first wireless network node and the at least one second wireless network node comprises a policy control function and/or an access and mobility management function.

8. The wireless communication method of claim 7, wherein the signaling path further comprises a session management function.

9. A wireless communication method for use in a second wireless network node, the method comprising:

transmitting, to a first wireless network node, time synchronization status information associated with a switching of a grandmaster clock; and receiving, from the first wireless network node, a time switch request associated with the switching of the grandmaster clock;

wherein the time switch request comprises at least one of:

information on a grandmaster clock candidate to which the grandmaster clock is switched, or an instructed switching time of switching the grandmaster clock to the selected grandmaster clock candidate.

10. The wireless communication method of claim 9, wherein the time synchronization status information comprises at least one of:

information on at least one grandmaster clock candidate to which the grandmaster clock is switched, or a switching time configured for the switching of the grandmaster clock.

11. The wireless communication method of claim 10, wherein the information on the grandmaster clock candidate comprises at least one of a grandmaster type, a grandmaster identifier, a grandmaster address or a grandmaster quality.

12. The wireless communication method of claim 9, further comprising:

receiving, from the first wireless network node, a subscription request for the time synchronization status information.

13. The wireless communication method of claim 9, wherein the first wireless network node comprises at least one of a session management function, a time sensitive communication and time synchronization function or a time sensitive networking adaptation function.

14. The wireless communication method of claim 9, wherein the second wireless network node comprises at least one of a user plane function, a network time sensitive networking translator, or a radio access network node.

15. The wireless communication method of claim 9, wherein the first network node comprises a time sensitive communication and time synchronization function and/or a time sensitive networking adaptation function, wherein a signaling path between the first wireless network node and the at least one second wireless network node comprises a policy control function and/or an access and mobility management function.

16. A computer program product comprising a computer-readable program medium code stored thereupon, the code, when executed by a processor, causing the processor to implement:

receiving, from at least one second wireless network node, time synchronization status information associated with a switching of a grandmaster clock;

transmitting, to the at least one second wireless network node, a time switch request associated with the switching of the grandmaster clock;

wherein the time switch request comprises at least one of:

information on a grandmaster clock candidate to which the grandmaster clock is switched, or an instructed switching time of switching the grandmaster clock to the grandmaster clock candidate;

or causing the processor to implement:

transmitting, to a first wireless network node, time synchronization status information associated with a switching of a grandmaster clock;

receiving, from the first wireless network node, a time switch request associated with the switching of the grandmaster clock;

wherein the time switch request comprises at least one of:

information on a grandmaster clock candidate to which the grandmaster clock is switched, or an instructed switching time of switching the grandmaster clock to the selected grandmaster clock candidate.

17. The wireless communication method of claim 15, wherein the signaling path further comprises a session management function.

* * * * *